United States Patent
Kim et al.

(10) Patent No.: US 9,614,612 B2
(45) Date of Patent: Apr. 4, 2017

(54) FAST PROTECTION SWITCHING METHOD FOR PASSIVE OPTICAL NETWORK

(71) Applicant: Electronics and Telecommunications Research Institute, Daejeon-si (KR)

(72) Inventors: Geun Yong Kim, Gwangju-si (KR); Sung Chang Kim, Gwangju-si (KR); Hark Yoo, Gwangju-si (KR); Hee Do Kim, Gwangju-si (KR); Dong Soo Lee, Gwangju-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 15 days.

(21) Appl. No.: 14/591,945

(22) Filed: Jan. 8, 2015

(65) Prior Publication Data

US 2015/0244454 A1   Aug. 27, 2015

(30) Foreign Application Priority Data

Feb. 24, 2014  (KR) .................. 10-2014-0021413

(51) Int. Cl.
 *H04B 10/032*  (2013.01)
(52) U.S. Cl.
 CPC .................. *H04B 10/032* (2013.01)
(58) Field of Classification Search
 CPC ................................. H04B 10/032
 USPC ............................................ 398/2
 See application file for complete search history.

(56) References Cited

U.S. PATENT DOCUMENTS

| 8,600,228 | B2* | 12/2013 | Rafel Porti | H04J 3/14 398/1 |
|---|---|---|---|---|
| 2008/0131124 | A1* | 6/2008 | Nam | H04B 10/032 398/67 |
| 2011/0013903 | A1* | 1/2011 | Rafel Porti | H04J 3/14 398/1 |
| 2012/0082449 | A1* | 4/2012 | Zheng | H04J 3/0682 398/25 |
| 2012/0114333 | A1* | 5/2012 | Zhang | H04Q 11/0067 398/58 |
| 2013/0148956 | A1* | 6/2013 | Khotimsky | H04B 10/032 398/2 |

FOREIGN PATENT DOCUMENTS

KR   10-0833504 B1   5/2008

OTHER PUBLICATIONS

McGettrick et al. "Ultra-fast 1+1 Protection in 10 Gb/s Symmetric Long Reach PON", 39th European Conference and Exhibition on Optical Communication, Sep. 22-26, 2013.

* cited by examiner

*Primary Examiner* — David Payne
*Assistant Examiner* — Omar S Ismail
(74) *Attorney, Agent, or Firm* — Rabin & Berdo, P.C.

(57) ABSTRACT

A fast protection switching method for a Passive Optical Network (PON). When performing protection switching from an operation link (an operation network) to a protection link (a protection network) in a PON, the fast protection switching method enables rapidly updating Equalization Delay (EqD) values, even if the EqD values are different for Optical Network Terminals (ONTs) of varying distances.

10 Claims, 7 Drawing Sheets

| Octet | Content | VALUE |
|---|---|---|
| 1-2 | ONU-ID | ONU-ID OF ONU TO RECEIVE MESSAGE |
| 3 | Message type ID | 0×04 |
| 4 | SeqNo | Unicast PLOAM sequence number |
| 5 | 0000 00SP | 00 |
| 6-9 | EqualizationDelay | CALCULATED EqD VALUE |
| 10-40 | Padding | 0 |
| 41-48 | MIC | CALCULATED MIC VALUE |

FIG. 6

| Octet | Content | VALUE |
|---|---|---|
| 1-2 | ONU-ID | ONU-ID OF ONU TO RECEIVE MESSAGE |
| 3 | Message type ID | 0×04 |
| 4 | SeqNo | Unicast PLOAM sequence number |
| 5 | 0000 00SP | ×1, × : do not care (0 or 1) |
| 6-9 | EqualizationDelay | CALCULATED EqD VALUE |
| 10-40 | Padding | 0 |
| 41-48 | MIC | CALCULATED MIC VALUE |

FIG. 7

| Octet | Content | VALUE |
|---|---|---|
| 1-2 | ONU-ID | 0×3FF |
| 3 | Message type ID | 0×04 |
| 4 | SeqNo | Broadcasting sequence number |
| 5 | 0000 00SP | 00 |
| 6-9 | EqualizationDelay | 0 |
| 10-40 | Padding | 0 |
| 41-48 | MIC | CALCULATED MIC VALUE |

FAST PROTECTION SWITCHING METHOD FOR PASSIVE OPTICAL NETWORK

CROSS-REFERENCE TO RELATED APPLICATION(S)

This application claims priority from Korean Patent Application No. 10-2014-0021413, filed on Feb. 24, 2014, in the Korean Intellectual Property Office, the entire disclosure of which is incorporated herein by reference for all purposes.

BACKGROUND

1. Field

The following description relates to a network protection switching technology that enables switching from an operation network to a protection network in response to an error in the operation network, and more particularly to a fast protection switching method in a Passive Optical Network.

2. Description of the Related Art

According to the 10-Gigabit-capable Passive Optical Networks (XG-PON) standard, an Optical Line Terminal (OLT) periodically transmits an upstream bandwidth map to an Optical Network Terminal (ONT) or an Optical Network Unit (ONU) in a Time Division Multiplexing (TDM)-based XG-PON system. The upstream bandwidth map is time map information necessary for each ONT to transmit data in upstream (that is, from the ONT to the OLT).

The OLT calculates a value of Round Trip Delay (RTD) from the OLT to the ONU with respect to each ONT through a ranging process, assumes that all the ONTs are away for the same distance (e.g., 20 km), and transmits delay information to each of the ONTs. The delay information refers to Equalization Delay (EqD).

Figure 1:
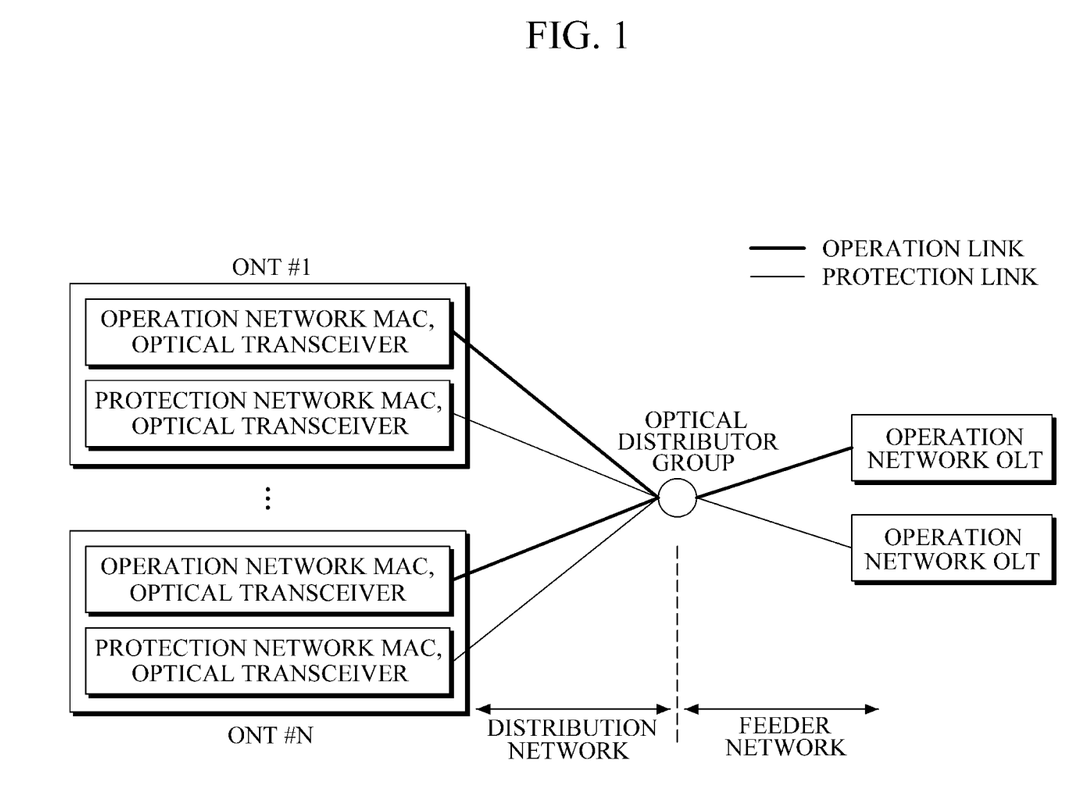
FIG. 1 is a diagram illustrating a Passive Optical Network (PON) link entirely duplex structure in a protection switching method for a PON.
Figure 2:
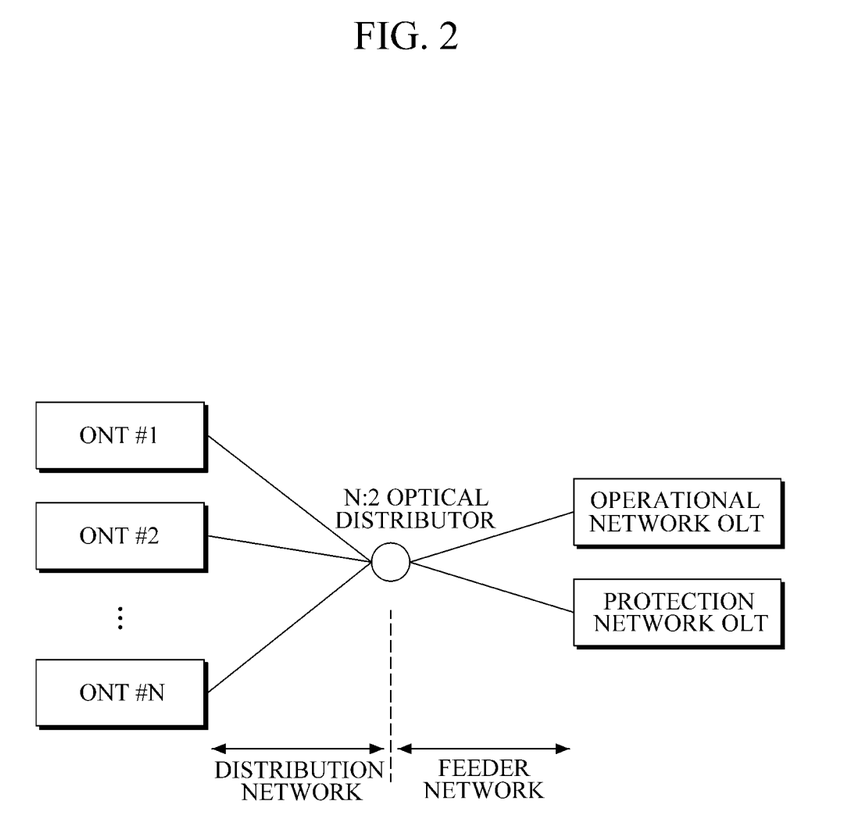
FIG. 2 is a diagram illustrating a PON link partially duplex structure in a protection switching method for a PON.

An optical network protection switching structure includes a PON link entirely duplex structure and a PON link partially duplex structure, as illustrated in FIGS. 1 and 2. Referring to FIG. 1, the PON link entirely duplex structure is configured to have two independent PON links for an operation network and a protection network, which are used as an operation link and a protection link, respectively. The PON link entirely duplex structure needs to correspond to independent PON links in two ONT systems, the characteristic that requires high-cost configurations (a Medial Access Control (MAC) chip and an optical transceiver) and duplex management.

The PON link partially duplex structure has a different feeder line, so that an ONT does not have a device for a protection link. Thus, the PON link partially duplex structure may be established with lost costs compared to the PON link entirely duplex structure, but unable to perform protection switching for a distribution network.

The technical object of the optical network protection switching technique is to perform protection switching to restore a link without affecting a service provided to a user. That is, it needs to perform protection switching without affecting a service provided to a user.

In response to a loss of signal (LOS) alarm (which is described in G.987.3 regarding XG-PON), an OLT in an operation link is switched to a protection link. The switching time includes backup time for existing subscriber information and time for correcting a change in distance to an ONT.

An OLT in a protection link needs to re-calculate Round Trip Delay (RTD) for each ONT and transmit an EqD value to each ONT. According to the XG-PON standard, RTD for ONTs are calculated in sequence, so that it is hard to calculate EqD values for ONTs within a short time.

Among various conventional methods for correcting a change in distance to an ONT, there is a method of transmitting a broadcast Physical Layer Operations, Administration and Maintenance (PLOAM) message including differences in RTD between all the ONTs. This method utilizes the characteristic that a distance between an operation link and a protection link exists only in the feeder network in the PON link partially duplex structure and thus there is no difference in RTD between all the ONTs. The PLOAM message is a control message transmitted and received between an OLT and an ONT, which is described in G.987.3).

However, a distance from an OLT to each ONT may differ in the PON link entirely duplex structure, so it is impossible to apply the above-described method thereto. To avoid the distance problem, Korean Patent No. 10-0833504 (May 23, 2008) has been proposed, which makes a distance between each operation link and each protection link to be the same. However, it is difficult to make a distance between each operation link and each protection link to be the same, and the operation network and the protection network generally have different loop locations.

Therefore, there was a need for studying a technology that solves a technical problem of fast switching between an operation network and a protection network, by rapidly updating Equalization Delay (EqD) values when performing protection switching from an operation link (an operation network) to a protection link (a protection network) in a PON, even if the EqD values are different for Optical Network Terminals (ONTs) of varying distances.

SUMMARY

In one general aspect, there is provided a fast protection switching method for a Passive Optical Network (PON), including: at a slave-mode Optical Network Terminal managed in a protection network, establishing communication connection to Optical Network Terminals (ONTs), calculating Equalization Delay (EqD) values for the respective ONTs, and transmitting the EqD values to the respective ONTs; at the ONTs, storing the EqD values received from the slave mode OLT; at a management server, in response to a protection switching event, instructing the slave-mode OLT to switch to a master-mode OLT; at the master-mode OLT switched from the salve-mode OLT, instructing the ONTs having transitioned to an idle state due to protection switching to update EqD values thereof; at the instructed ONTs in the idle state, updating the EqD values thereof to be the stored EqD values; and terminating protection switching to enable the ONTs to transition to an operation state after completion of updating the EqD values and to properly communicate with the master-mode OLT switched from the slave-mode OLT.

The slave-mode OLT may calculate the EqD values for the respective ONTs at predetermined time intervals, and transmit the calculated EqD values to the respective ONTs.

The fast protection switching method may further include, at the management server, determining one of a plurality of OLTs as a master-mode OLT managed in an operation network and another thereof as a slave-mode OLT managed in a protection network, and notifying a result of the determination to the master-mode OLT and the slave-mode OLT; and, at the management server, instructing to calculate EQD values for correction so that all the ONTs are at a same logical distance from the slave-mode OLT.

The fast protection switching method may further include, at the slave-mode OLT, terminating communication connection to all the ONTs and reporting the management server of completion of storing the EqD values, after all the ONTs complete storing the EqD values.

The fast protection switching method may further include, at the management server, instructing the master-mode OLT to perform a bring-up for activating an optical network service.

The fast protection switching method may further include performing the bring-up by the instructed master-mode OLT to provide the optical network service to the plurality of ONTs over the operation network.

The fast protection switching method may further include reporting an occurrence of a loss of signal (LOS) when the LOS occurs due to an error of the operation network when the optical network service is being provided over the operation network.

All the ONTs may transition to the idle state when the LOS occurs due to the error of the operation network.

The ONTs may remain in the idle state for a predetermined period of time.

The fast protection switching method may further include, at the management server, causing a protection switching event to occur when the master-mode OLT reports the occurrence of the LOS.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The XG-PON standard does not state a PON protection procedure. However, according to G.987.3, if a link to a Passive Optical Network (PON) is disconnected, an Optical Network Terminal (ONT) transitions to an Intermittent Loss of Downstream Synchronization (LODS) state, that is, an idle state, from an operation state (which is one of operational states described in G.987.3) to remain for a predetermined period of time during which the ONT is able to perform a proper process for protection switching.

It may be implied that an Optical Network Terminal (OLT) updates a EqD value until the TO2 timer expires. A recommended value for the TO2 timer is 100 ms. The OLT transmits a Broadcasting Ranging_Time Physical Layer Operations, Administration and Maintenance (PLOAM) message to every ONT to correct an EqD value related to a distance between an operation network and protection network. Each ONT updates EqD values and then transitions to an operation state, so that the protection switching process is finished.

Figure 3:
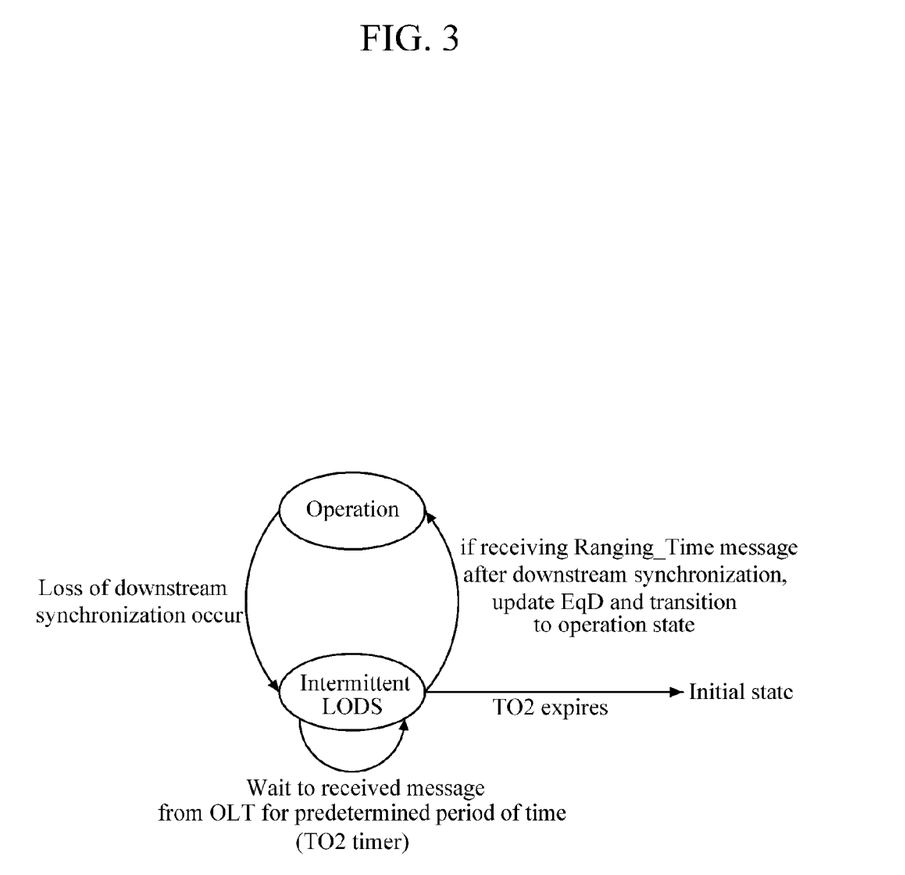
FIG. 3 is a diagram illustrating a state transition process for enabling an Optical Network Terminal (ONT) to update Equalization Delay (EqD).

FIG. 3 is a diagram illustrating a state transition process for enabling an ONT to update an EqD value. However, this process is enabled only when the difference in distance between an operation link and a protection link for each pair of ONT and OLT is consistent. Thus, it is impossible to employ the process in a PON link entirely duplex structure, in which a distance between an OLT and an ONT may be different from each other. To solve this technical problem, there is proposed a fast protection switching method that is able to be applied both to a PON link entirely duplex structure and to a PON link partially duplex structure.

Figure 4:
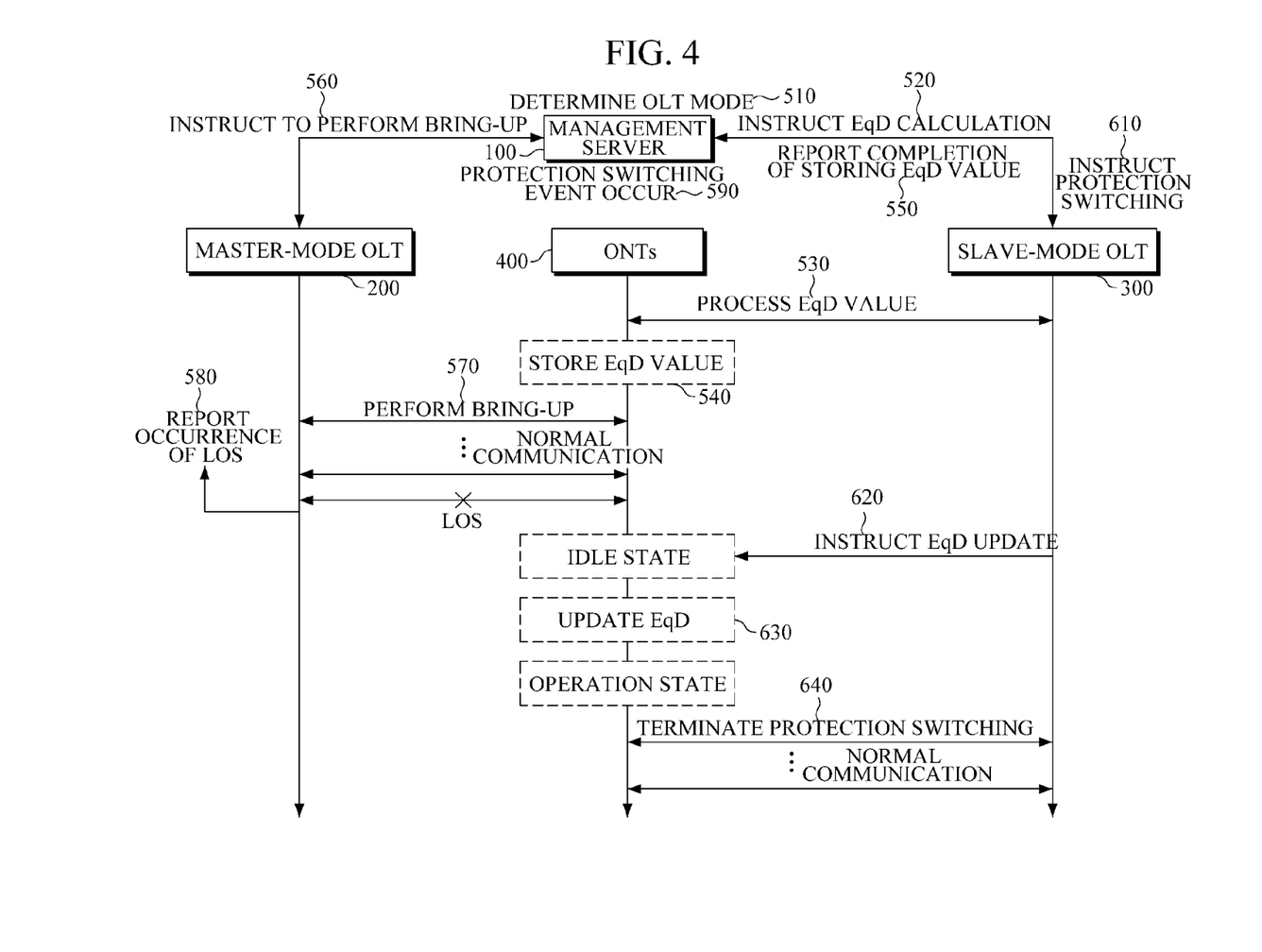
FIG. 4 is a diagram illustrating a configuration of a fast protection switching system in a PON and a fast protection switching process.

FIG. 4 is a diagram illustrating a configuration of a fast protection switching system for a PON and a fast protection switching process. As illustrated in FIG. 4, the fast protection switching system for a PON includes a management server 100 configured to manage protection switching, a master-mode OLT 200 managed in an operation network, a slave-mode OLT 300 managed in a protection network, and a plurality of ONTs 400, that is, subscriber terminals, which are connected to the master-mode OLT 200 and the slave-mode OLT 300 to receive optical network services.

For fast protection switching, in 510, the management server 100 determine one of the OLTs 400 as the master-mode OLT 200 managed in an operation network and another OLT 400 as the slave-mode OLT 300 managed in a protection network, and notifies a result of determination to the master-mode OLT 200 and the slave-mode OLT 300.

In 520, the management server 100 instructs the slave mode OLT 300 to calculate an EqD value for correction so that all the ONTs 400 are at the same logical distance from the slave mode OLT 300.

In 530, the OLT 300 managed in a protection network establishes communication connection to the ONTs 400, calculates EqD values for the respective ONTs 400 through a ranging process, and transmits the calculated EqD values to the respective ONTs 400. The calculation of EqD values through a ranging process is a well-known technique, and thus detailed descriptions thereof is omitted.

Specifically, in 530, the slave-mode OLT 300 calculates the EqD values for the respective ONTs 400 at predetermined time intervals and transmits the EqD values to the respective ONTs 400. Accordingly, it is possible to reflect an EqD value for any new ONT to operate in the protection network, and to reflect a fluctuation in Round Trip Delay, which occurs due to a change in temperature or humidity during operation, so that the EqD values for the respective ONTs to operate in the protection network may be constantly updated.

Figure 5:
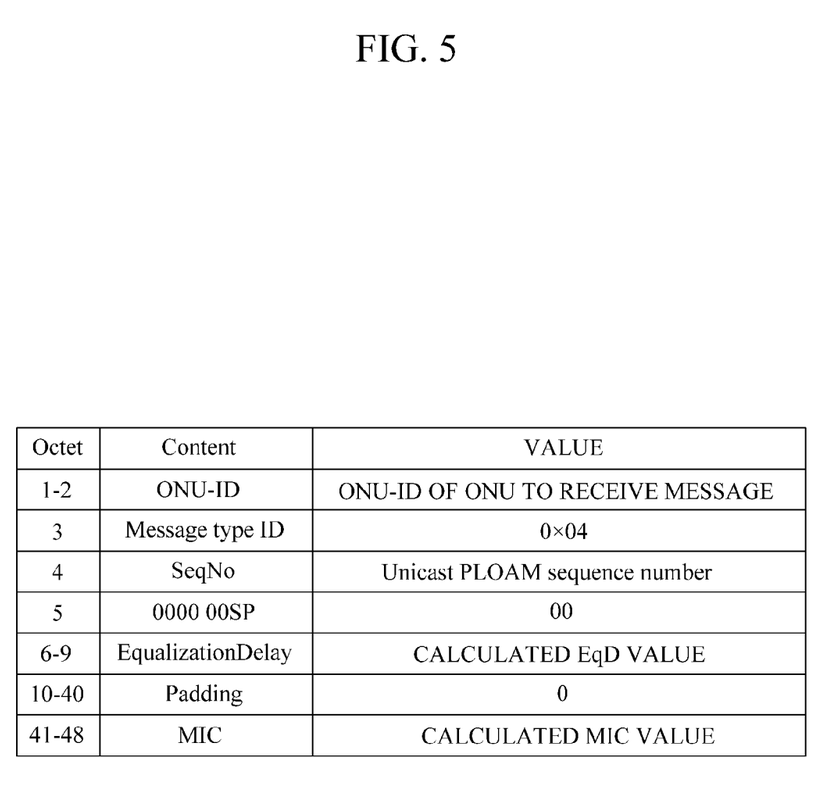
FIG. 5 is a diagram illustrating an example of a Ranging_Time Physical Layer Operations, Administration and Maintenance (PLOAM) message transmitted by an Optical Line Terminal (OLT) in a slave mode.

For example, in 530, the slave-mode OLT 300 may transmit an EqD value to an ONT using a Ranging_Time PLOAM message described in G.987.3, which is a control message transmitted and received between an OLT and an ONT. At this point, as illustrated in FIG. 5, by setting '00' in the SP field of the Ranging_Time PLOAM message, the slave-mode OLT 300 is able to notify that the EqD value transmitted to the ONT is an EqD value regarding the protection network.

In 540, the ONTs 400 that received the EqD values from the slave-mode OLT 300 stores the respective EqD values.

In 550, after the EqD values are stored, the slave-mode OLT 300 terminates links to the ONTs 400 and reports the management server 100 of completion of storing the EqD values.

In 560, in response to receipt of the reports from the slave-mode OLT 300, the management server 100 instructs the master-mode OLT 200 to perform a bring-up for activating an optical network service.

In 570, in response to the instruction, the master-mode OLT 200 performs a bring-up to provide the optical network service to a plurality of ONTs over the operation network.

At this point, the master-mode OLT 200 calculates EqD values through a ranging process, the EqD values that are necessary for correction so that all the ONTs 400 are at the same logical distance from the master-mode OLT 200. The ranging process is a well-known technique, and thus detailed descriptions thereof are omitted.

Figure 6:
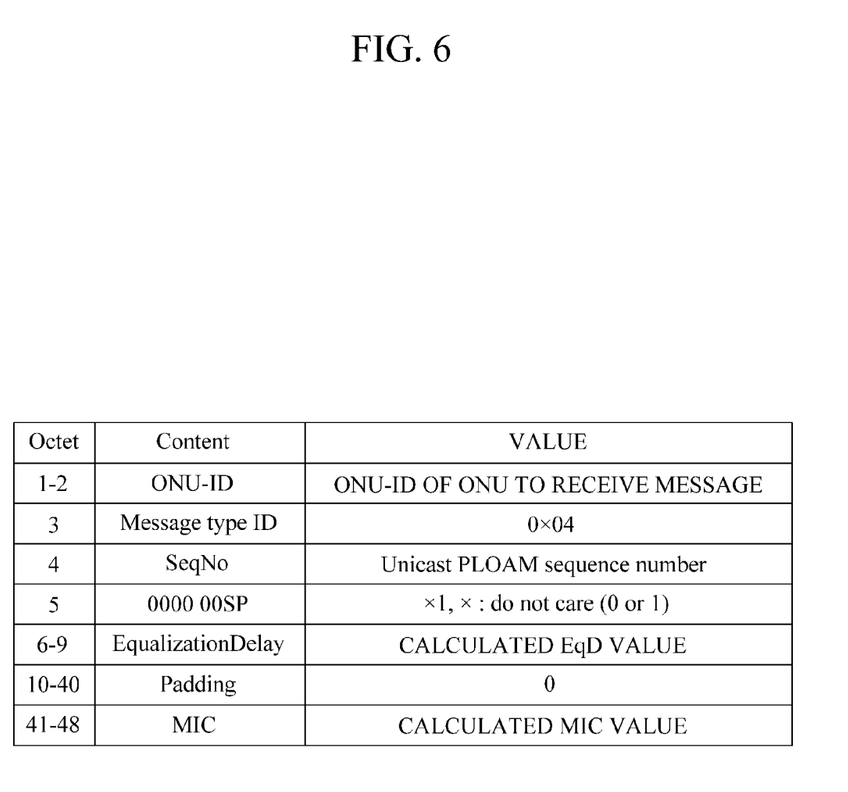
FIG. 6 is a diagram illustrating an example of a Ranging_Time PLOAM message transmitted by an OLT in a master mode.

For example, the master-mode OLT 220 may transmit an EqD value to an ONT using a Ranging_Time PLOAM message described in G.987.3, which is a control message transmitted and received between OLTs and ONTs. At this point, as illustrated in FIG. 6, by setting 'X1' in the SP field of the Ranging_Time PLOAM message, the master-mode OLT 200 is able to notify that the EqD value transmitted to the ONT is an EqD value regarding the operation network.

Using this process, an optical network service is provided to a plurality of ONTs over the operation network. If a loss of signal (LOS) occurs due to an error in the operation network when the optical network service is being provided over the operation network, the master-mode OLT 200 reports the management server 100 of occurrence of the LOS in 580.

At this point, in response to the occurrence of the LOS, all of the ONTs transition to an idle state in 580. In 580, the ONTs 400 may remain in the idle state for a predetermined period of time. For example, the ONTs 400 may transition to an intermittent loss of downstream synchronization (LODS) state, described in G.987.3, and stand by for predetermined period of time TO2.

In 590, in response to the report from the master-mode OLT 200 of the occurrence of the LOS, the management server 100 causes a protection switching event to occur. In response to the occurrence of the protection switching event, protection switching from the operation network to the protection network is performed.

In 610, the management server 100 instructs the slave-mode OLT 300 to switch to a master-mode OLT.

In 620, the master-mode OLT switched from the salve-mode OLT 300 instructs that all the ONTs 400 which have transitioned to the idle state.

Figure 7:
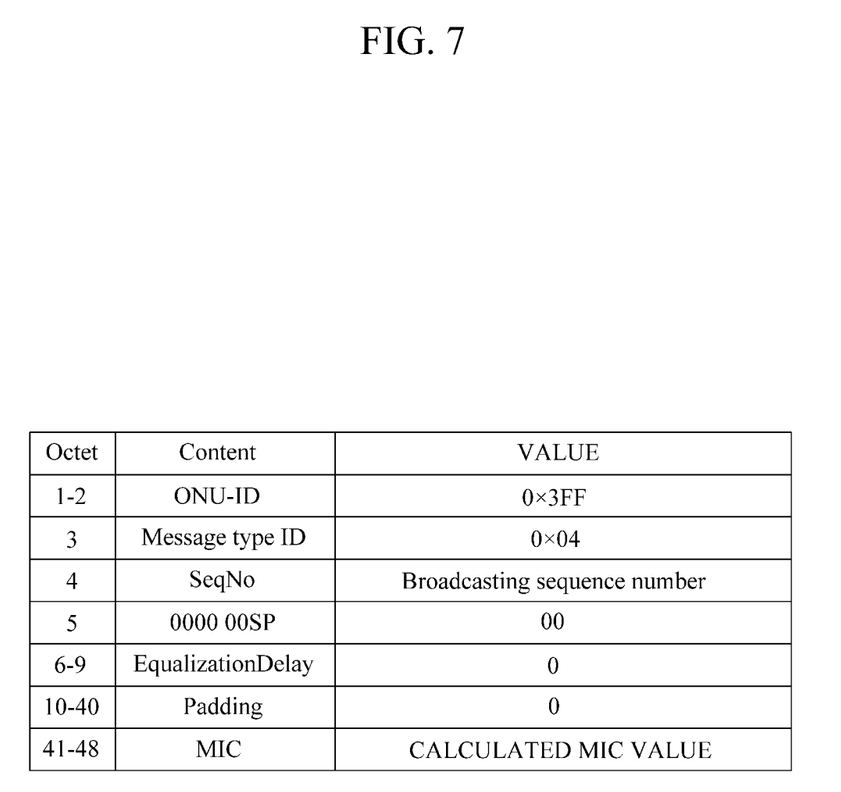
FIG. 7 is a diagram illustrating an example of a broadcasting Ranging_Time PLOAM message transmitted by an OLT in a master mode switched from a slave mode.

For example, by using a broadcast Ranging_Time PLOAM message described in G.987.3, which is a control message transmitted and received between OLTs and ONTs, the slave-mode OLT 300 may instruct the ONTs to update EqD values. At this point, as illustrated in FIG. 7, by setting '00' in the SP field and '0' in the EqD field of the a broadcast Ranging_Time PLOAM message and transmit the broadcast Ranging_Time PLOAM message to the ONTs, the slave-mode OLT 300 may notify that the broadcast Ranging_Time PLOAM message aims to instruct update of an EqD value.

In 630, in response to the instruction from the master-mode OLT switched from the slave-mode OLT 300 when remaining in an idle mode, the ONTs 400 updates EqD values to be the EqD values stored in operation 540. The EqD values before the update are values calculated and transmitted by the master-mode OLT 200 in the operation network.

In 640, after updating the EqD values, the ONTs 400 transitions to an operation state to perform normal communication with a master-mode OLT switched from the slave-mode OLT 300. At this point, if an LOS occurs due to an error in the operation network, the master-mode OLT 200 is switched to a slave-mode OLT.

As described above, when performing switching from an operation link (an operation network) to a protection link (a protection network) in a PON, the present disclosure is able to update EqD values of ONTs at varying distances without a ranging process, by calculating and storing in advance EqD values necessary for operation in a protection network. Accordingly, it is possible to reduce protection switching time and achieve the above-mentioned object of the present disclosure.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A fast protection switching method for a Passive Optical Network (PON), the method comprising:
  directing, by a management server, a first optical line terminal (OLT) to operate as a master-mode OLT, and directing a second OLT to operate as a slave-mode OLT;
  establishing, by the second OLT operating as the slave-mode OLT, prior to a protection switching event, a communication connection to Optical Network Terminals (ONTs), calculating Equalization Delay (EqD) values for the ONTs, and transmitting the EqD values to the ONTs prior to the protection switching event;
  at the ONTs, storing the EqD values received from the second OLT prior to the protection switching event;
  at a management server, in response to the protection switching event, instructing the second OLT to switch to a master-mode OLT;
  at the second OLT operating as the master-mode OLT, instructing the ONTs having transitioned to an idle state due to protection switching to update EqD values thereof;
  at the instructed ONTs in the idle state, updating the EqD values thereof to be the EqD values received from the second OLT and stored prior to the protection switching event; and
  terminating protection switching to enable the ONTs to transition to an operation state after completion of said updating the EqD values and to properly communicate with the second OLT operating as the master-mode OLT switched from the slave-mode OLT.

2. The fast protection switching method of claim 1, wherein the second OLT operating as the slave-mode OLT calculates the EqD values for the ONTs at predetermined time intervals, and transmits the calculated EqD values to the ONTs.

3. The fast protection switching method of claim 1, further comprising:
at the management server, determining one of a plurality of OLTs as the master-mode OLT managed in an operation network and another thereof as the slave-mode OLT managed in a protection network, and notifying a result of the determination to the master-mode OLT and the slave-mode OLT; and
at the management server, instructing the second OLT operating as the slave-mode OLT to calculate EqD values for correction so that all the ONTs are at a same logical distance from the slave-mode OLT.

4. The fast protection switching method of claim 1, further comprising:
at the slave-mode OLT, terminating communication connection to all of the ONTs and reporting completion of storing the EqD values to the management server, after all of the ONTs complete storing the EqD values.

5. The fast protection switching method of claim 4, further comprising:
at the management server, instructing the master-mode OLT to perform a bring-up for activating an optical network service.

6. The fast protection switching method of claim 5, further comprising:
performing the bring-up by the instructed master-mode OLT to provide the optical network service to the plurality of ONTs over the operation network.

7. The fast protection switching method of claim 6, further comprising:
reporting an occurrence of a loss of signal (LOS) when the LOS occurs due to an error of the operation network when the optical network service is being provided over the operation network.

8. The fast protection switching method of claim 7, wherein all of the ONTs transition to the idle state when the LOS occurs due to the error of the operation network.

9. The fast protection switching method of claim 8, wherein the ONTs remain in the idle state for a predetermined period of time.

10. The fast protection switching method of claim 7, further comprising:
at the management server, causing a protection switching event to occur when the master-mode OLT reports the occurrence of the LOS.

* * * * *